Nov. 7, 1967  E. S. GANDRUD  3,350,950
SPROCKET WHEEL

Filed March 11, 1966 2 Sheets-Sheet 1

INVENTOR.
*EBENHARD S. GANDRUD*
BY
*Merchant & Gould*
ATTORNEYS

Nov. 7, 1967  E. S. GANDRUD  3,350,950
SPROCKET WHEEL
Filed March 11, 1966  2 Sheets-Sheet 2
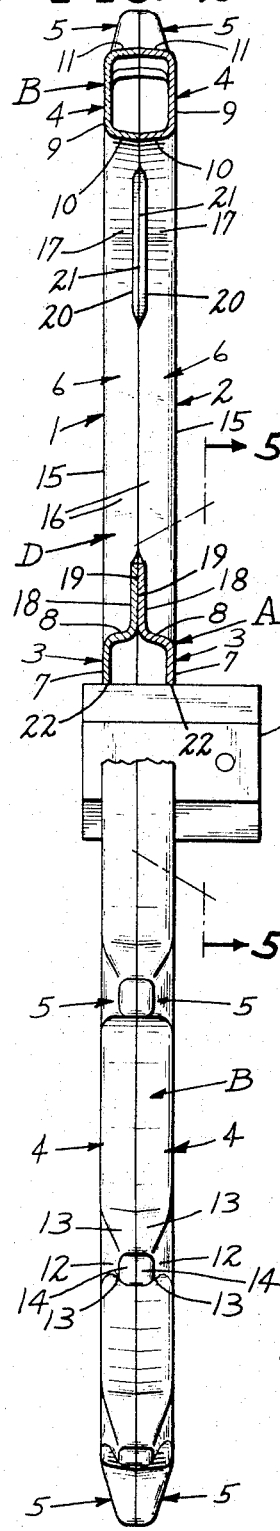
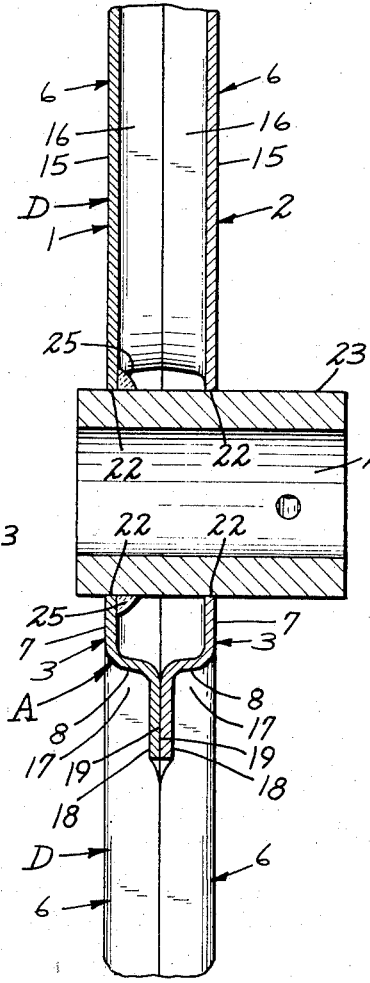
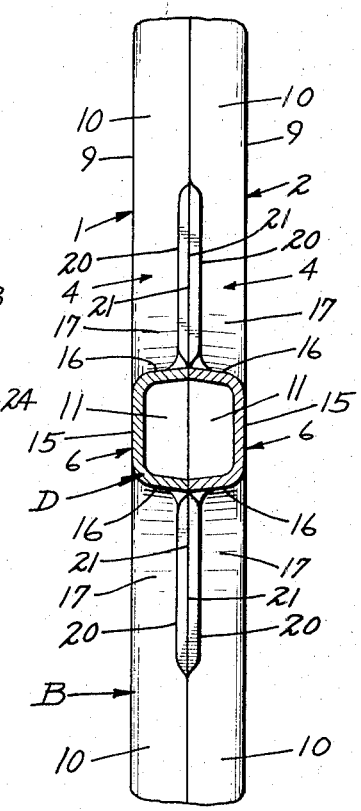
INVENTOR.
EBENHARD S. GANDRUD
BY
Merchant & Gould
ATTORNEYS United States Patent Office 3,350,950
Patented Nov. 7, 1967

3,350,950
SPROCKET WHEEL
Ebenhard S. Gandrud, P.O. Box 528,
Owatonna, Minn. 55060
Filed Mar. 11, 1966, Ser. No. 533,495
7 Claims. (Cl. 74—243)

This invention relates generally to power transmission devices and more particularly, to improvements in sprocket wheel construction.

Heretofore, sprocket wheeels, commonly used in connection with chain drives of various power driven agricultural implements or other mechanisms, have been made by casting, drop forging, or the like. These procedures are not only costly but wheels produced thereby are relatively heavy. Attempts to lighten the weight by providing spokes and reducing the cross sectional areas of the wheel material have resulted in sprocket wheels which are quite brittle and easily broken, particularly when such lighter weight wheels are made of cast iron.

An important object of this invention is the provision of a sprocket wheel which is light in weight, extremely rigid and highly resistant to breakage.

Another object of this invention is the provision of a sprocket wheel which is long wearing and which can be produced with a high degree of accuracy.

Still another object of this invention is the provision of a sprocket wheel which can be stamped from readily available sheet metal at low cost, requiring no further machining.

To the above ends, I provide a sprocket wheel comprising a pair of opposed cooperating members formed from a pair of blanks of sheet metal and each including a hub portion, a toothed rim portion and a plurality of circumferentially spaced radial spoke portions, each of said portions having a radially outer wall generally transverse to the axis of the sprocket wheel and generally axially projecting side walls having axially inner edges disposed in a common plane transverse to the sprocket wheel axis, the inner edges of one of the members abutting corresponding inner edges of the other member. Each of said members further includes flat web portions at the opposite ends of said spoke portions adjacent the hub and rim portions, each of the web portions having a surface coplanar with the inner edges of its respective sprocket wheel member whereby to be disposed in face-to-face engagement with a cooperating web portion of the other wheel member. Each web portion is spot welded or otherwise rigidly secured to its cooperating web portion to anchor the members together in edge-to-edge abutting relationship.

The above, and still further highly important objects and advantages of this invention will become apparent from the following detailed specification, appended claims and attached drawings.

Referring to the drawings, in which like reference characters indicate like parts throughout the several views:

FIG. 2 is an enlarged view in side elevation, some parts being broken away and some parts being shown in section; FIG. 3 is an enlarged fragmentary section taken on the line 3—3 of FIG. 1;

FIG. 4 is an enlarged fragmentary section taken on the line 4—4 of FIG. 1; and

Figure 1:
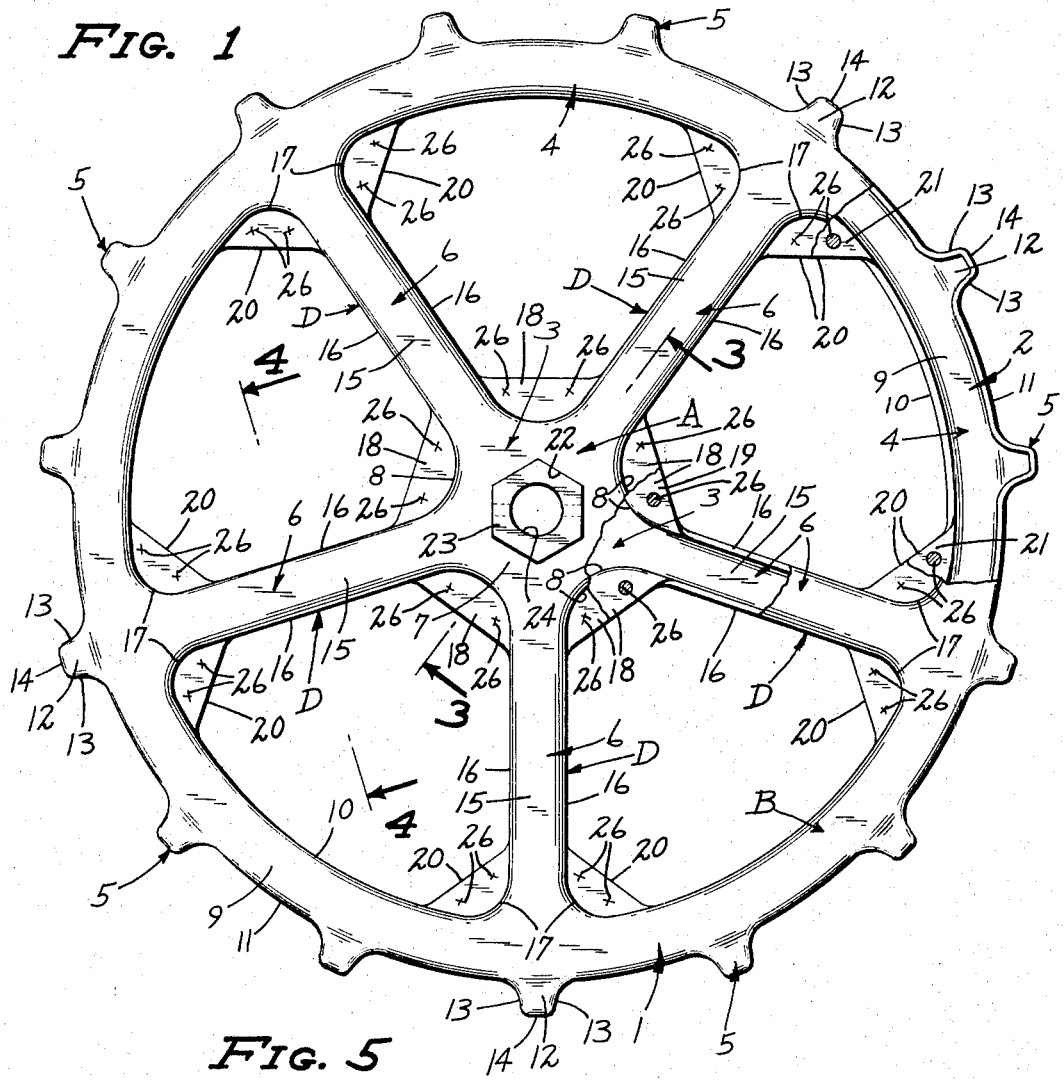
FIG. 1 is a view in end elevation of a sprocket wheel produced in accordance with this invention, some parts being broken away and some parts being shown in section.

In the preferred embodiment of the invention illustrated, a sprocket wheel is shown as comprising a pair of identical wheel members 1 and 2 formed from sheet metal by conventional stamping procedures, utilizing blanking and forming dies and cooperating punches, not shown. The wheel members 1 and 2 each comprise a hub portion 3, a circular rim portion 4 concentric with the hub portion 3, a plurality of tooth portions 5 projecting radially outwardly from their respective rim portions 4, and a plurality of circumferentially spaced radial spoke portions 6 connecting the hub portions 3 and rim portions 4.

Each of the wheel members 1 and 2 is formed from a single blank of sheet metal, such as steel, so that the hub, rim, tooth and spoke portions of each wheel member 1 and 2 are integral parts of their respective wheel members. Further, each of wheel member portions 3–6 is formed to provide an axially outer wall generally transverse to the axis of the sprocket wheel, and generally axially projecting side walls having axially inner edges disposed in a common plane transverse to the sprocket wheel axis. More specifically, each hub portion 3 has an axially outer wall 7 and generally axially projecting side walls 8, the rim portions 4 each having an axially outer wall 9 and radially spaced generally axially projecting walls 10 and 11. The tooth portions 5 have axially outer walls 12 and axially projecting walls 13 and 14, and the spoke portions 6 have axially outer walls 15 and spaced generally parallel axially projecting walls 16. In the form of the invention illustrated, the outer walls 7, 9 and 15 of each wheel member 1 and 2 are disposed in a common plane, the axially outer walls 12 of the tooth portions 5 tapering axially inwardly or radially outwardly toward the extended plane of the axially inner edges of the side walls 8, 10, 11, 13, 14 and 16.

As shown, when the wheel members 1 and 2 are placed together in edge-to-edge relationship, the members cooperate to provide a hollow hub A, a hollow circular rim B concentric with the hub A, hollow teeth projecting radially from the rim B and circumferentially spaced hollow spokes D connecting the hub A with the rim B.

It will be noted, with reference particularly to FIG. 1, that the side walls 8 of the hub portions 3 are arcuate and tangent to adjacent side walls 16 of the spoke portions 15, at the inner ends of the spoke portions 15. Further, the opposite ends of the radially inner side walls 10 of the rim portions 4 join adjacent side walls 16 to provide arcuate side wall portions 17. The wheel members 1 and 2 are formed, adjacent the hub portions 3 and inner ends of the spoke portions 15 with segmental webs 18 having axially inner surfaces 19 that are disposed in the common plane of the axially inner edges of the side walls 8, 10, 11, 13, 14 and 16. The wheel members 1 and 2 are further formed to provide segmental webs 20 which join the outer end portions of the spoke portions 15 with adjacent ends of the rim portion 4, the webs 20, like the webs 18 having axially inner surfaces 21 disposed in the common plane of the various side walls 8, 10, 11, 13, 14 and 16. Thus, when the wheel members 1 and 2 are placed together in the above-described edge-to-edge relationship, the webs 18 and 20 of the wheel member 1 are disposed in face-to-face engagement with respective webs 18 and 20 of the wheel member 2.

Figure 5:
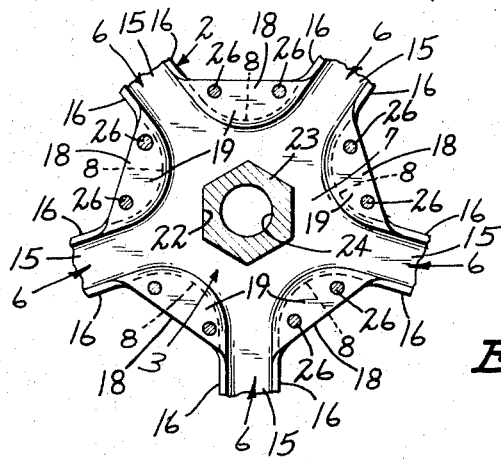
FIG. 5 is a fragmentary section taken substantially on the line 5—5 of FIG. 2, on a reduced scale.

The hub portions 3 of the wheel members 1 and 2 are provided with axially aligned central openings 22 that are preferably polygonal in outline, for reception of a bushing 23 having an axial opening 24 therethrough for mounting on a shaft or the like, not shown. As shown, the bushing 23 is cross-sectionally polygonal and of a size to closely fit the aligned openings 22, the bushing 23 being welded or otherwise rigidly secured to one of the wheel members 1 and 2, as indicated at 25 in FIG. 3. The wheel members 1 and 2 are rigidly anchored together adjacent the hub portions 3 by spot welding the webs 18 of the wheel member 1 to respective webs 18 of the wheel member 2, as shown by cross marks and cross-hatched circles 26 in FIGS. 1 and 5. Respective webs 20 are also spot welded together, as indicated at 26 in FIG. 1. It will be noted that each web 18 and 20 is spot welded to its corresponding web 18 or 20 in at least two places, whereby to provide a secure connection between the wheel members 1 and 2, this welding of the webs and the edge-to-edge engagement of the various side walls of the wheel members 1 and 2 providing for an extremely rigid and strong finished sprocket wheel.

By properly designing the blanking and forming dies for producing the wheel members 1 and 2, the metal thickness of the members 1 and 2 is uniform throughout all of the portions thereof, and the necessity for utilizing trimming or shaving dies to obtain proper and full edge-to-edge contact between the wheel members is eliminated. In the above described construction, each of the wheel members 1 and 2 braces the other thereof, thus permitting the use of relatively thin sheet metal to provide a lightweight but rigid sprocket wheel having extreme tensile strength.

This invention has been thoroughly tested and found to be completely satisfactory for the accomplishment of the objectives set forth; and, while I have shown and described a commercial embodiment of my improved sprocket wheel, it will be understood that the same is capable of modification without departure from the spirit and scope of the invention, as defined in the claims.

What is claimed is:

1. A sprocket wheel including a hub, a rim concentric with said hub, circumferentially spaced teeth on said rim, and circumferentially spaced radial spokes having opposite ends connected to said hub and rim; characterized by a pair of sheet metal blanks formed to provide opposed sprocket wheel members each having hub, rim, tooth and spoke portions; each of said portions comprising an axially outer wall generally transverse to the axis of said sprocket wheel, and generally axially projecting side walls having axially inner edges disposed in a common plane transverse to the sprocket wheel axis; said inner edges of the side walls of one of said members abutting corresponding inner edges of the other of said members; said members having web portions adjacent said hub and rim portions at the opposite ends of said spoke portions; said web portions having flat surfaces coplanar with the inner edges of their respective member portions and each disposed in face-to-face engagement with a corresponding web portion of the opposite member and rigidly anchored thereto.

2. The sprocket wheel defined in claim 1 in which said web portions each have a generally segmental outline, said web portions adjacent said hub portions each providing a connection between the inner ends of adjacent spoke portions.

3. The sprocket wheel defined in claim 1 in which each of said web portions of one of said members is spot-welded to its corresponding web portion of the other of said members.

4. The sprocket wheel defined in claim 3 in which each of said web portions is spot-welded to its corresponding web portion in at least two spaced apart areas thereof.

5. The sprocket wheel defined in claim 1 in which said hub portions define aligned central openings, characterized by a central bushing extending axially through said openings and rigidly anchored to at least one of said members.

6. The sprocket wheel defined in claim 5 in which said aligned openings are polygonal, said bushing having a cross sectional shape corresponding to said aligned openings and closely fitted therein.

7. The sprocket wheel defined in claim 1 in which said outer walls of the rim, hub and spoke portions are substantially parallel to the planes of said inner edges, the axially outer walls of said teeth sloping in a radially outward direction toward the extended plane of the abutting inner edges.

References Cited

UNITED STATES PATENTS

| | | | |
|---|---|---|---|
| 2,800,031 | 7/1957 | Schultz | 74—243 |
| 2,823,553 | 2/1958 | Harrington | 74—243 |

MILTON KAUFMAN, *Primary Examiner.*

J. A. WONG, *Assistant Examiner.*